US011860561B2

(12) United States Patent
Yamazaki et al.

(10) Patent No.: US 11,860,561 B2
(45) Date of Patent: Jan. 2, 2024

(54) IMAGE READING DEVICE AND IMAGE FORMING APPARATUS INCORPORATING THE IMAGE READING DEVICE

(71) Applicants: Kimiharu Yamazaki, Kanagawa (JP); Kohta Aoyagi, Kanagawa (JP); Tatsuya Ishii, Kanagawa (JP); Tohru Matsumoto, Kanagawa (JP); Satoshi Nakayama, Kanagawa (JP); Ryosuke Ebinuma, Tokyo (JP); Ryoh Ishitsuka, Kanagawa (JP)

(72) Inventors: Kimiharu Yamazaki, Kanagawa (JP); Kohta Aoyagi, Kanagawa (JP); Tatsuya Ishii, Kanagawa (JP); Tohru Matsumoto, Kanagawa (JP); Satoshi Nakayama, Kanagawa (JP); Ryosuke Ebinuma, Tokyo (JP); Ryoh Ishitsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/682,218

(22) Filed: Feb. 28, 2022

(65) Prior Publication Data

US 2022/0291618 A1 Sep. 15, 2022

(30) Foreign Application Priority Data

Mar. 11, 2021 (JP) ................................ 2021-039275
Aug. 31, 2021 (JP) ................................ 2021-141281

(51) Int. Cl.
*G03G 15/00* (2006.01)

(52) U.S. Cl.
CPC ......... *G03G 15/55* (2013.01); *G03G 15/5041* (2013.01); *G03G 15/5062* (2013.01)

(58) Field of Classification Search
CPC ........................... G03G 15/55; G03G 15/5062
See application file for complete search history.

(56) References Cited

U.S. PATENT DOCUMENTS

| | | | | |
|---|---|---|---|---|
| 2014/0285852 | A1 | 9/2014 | Aikawa et al. | |
| 2016/0187828 | A1* | 6/2016 | Fukami .................. | G03G 15/55 399/81 |
| 2017/0031636 | A1 | 2/2017 | Kitai | |
| 2018/0020108 | A1 | 1/2018 | Nakayama et al. | |
| 2018/0335742 | A1* | 11/2018 | Narimatu ........... | G03G 15/5062 |

(Continued)

FOREIGN PATENT DOCUMENTS

| | | | |
|---|---|---|---|
| JP | 2014-184649 | A | 10/2014 |
| JP | 2017-202627 | A | 11/2017 |
| JP | 2020-046523 | | 3/2020 |

OTHER PUBLICATIONS

Extended European Search Report dated Aug. 3, 2022 issued in corresponding European Appln. No. 22158924.5.

*Primary Examiner* — Carla J Therrien
(74) *Attorney, Agent, or Firm* — Harness, Dickey & Pierce, P.L.C.

(57) ABSTRACT

An image reading device includes an image reader and circuitry. The image reader is configured to read an image on a recording medium. The circuitry is configured to obtain defective image information and defect type information based on the image on the recording medium read by the image reader, and determine an abnormality of the image on the recording medium based on the defective image information and the defect type information.

19 Claims, 9 Drawing Sheets

(56) References Cited

U.S. PATENT DOCUMENTS

| | | | | |
|---|---|---|---|---|
| 2019/0281169 | A1 | 9/2019 | Kawasaki | |
| 2020/0051231 | A1* | 2/2020 | Tsukamoto | G06F 3/1234 |
| 2020/0089151 | A1* | 3/2020 | Yoshino | G03G 15/5041 |
| 2021/0042065 | A1 | 2/2021 | Yamamoto | |

* cited by examiner

IMAGE READING DEVICE AND IMAGE FORMING APPARATUS INCORPORATING THE IMAGE READING DEVICE

CROSS-REFERENCE TO RELATED APPLICATIONS

This patent application is based on and claims priority pursuant to 35 U.S.C. § 119(a) to Japanese Patent Application Nos. 2021-039275, filed on Mar. 11, 2021, and 2021-141281, filed on Aug. 31, 2021, in the Japan Patent Office, the entire disclosure of each of which is hereby incorporated by reference herein.

BACKGROUND

Technical Field

Embodiments of the present disclosure relate to an image reading device and an image forming apparatus incorporating the image reading device.

Background Art

Electrophotographic image forming apparatuses known in the art employ a technique of performing image position correction and color changes by reading a sheet and an image that is fixed to the sheet by an image reading device, then detecting a defective image based on the reading result, and then feeding back the reading result to the image forming device. For example, a typical image forming apparatus in the art discloses a technique of outputting a dedicated chart for defect image detection and setting whether to perform detection based on the degree of abnormality of the defective image for the purpose of setting an appropriate threshold value of the defect image in accordance with an actual sample.

SUMMARY

Embodiments of the present disclosure described herein provide a novel image reading device including an image reader and circuitry. The image reader reads an image on a recording medium. The circuitry obtains defective image information and defect type information based on the image on the recording medium read by the image reader, and determines an abnormality of the image on the recording medium based on the defective image information and the defect type information.

Further, embodiments of the present disclosure described herein provide an image forming apparatus including an image forming device that forms an image on a recording medium, and the above-described image reading device.

BRIEF DESCRIPTION OF THE SEVERAL VIEWS OF THE DRAWINGS

Exemplary embodiments of this disclosure will be described in detail based on the following figures, wherein.

Figure 1:
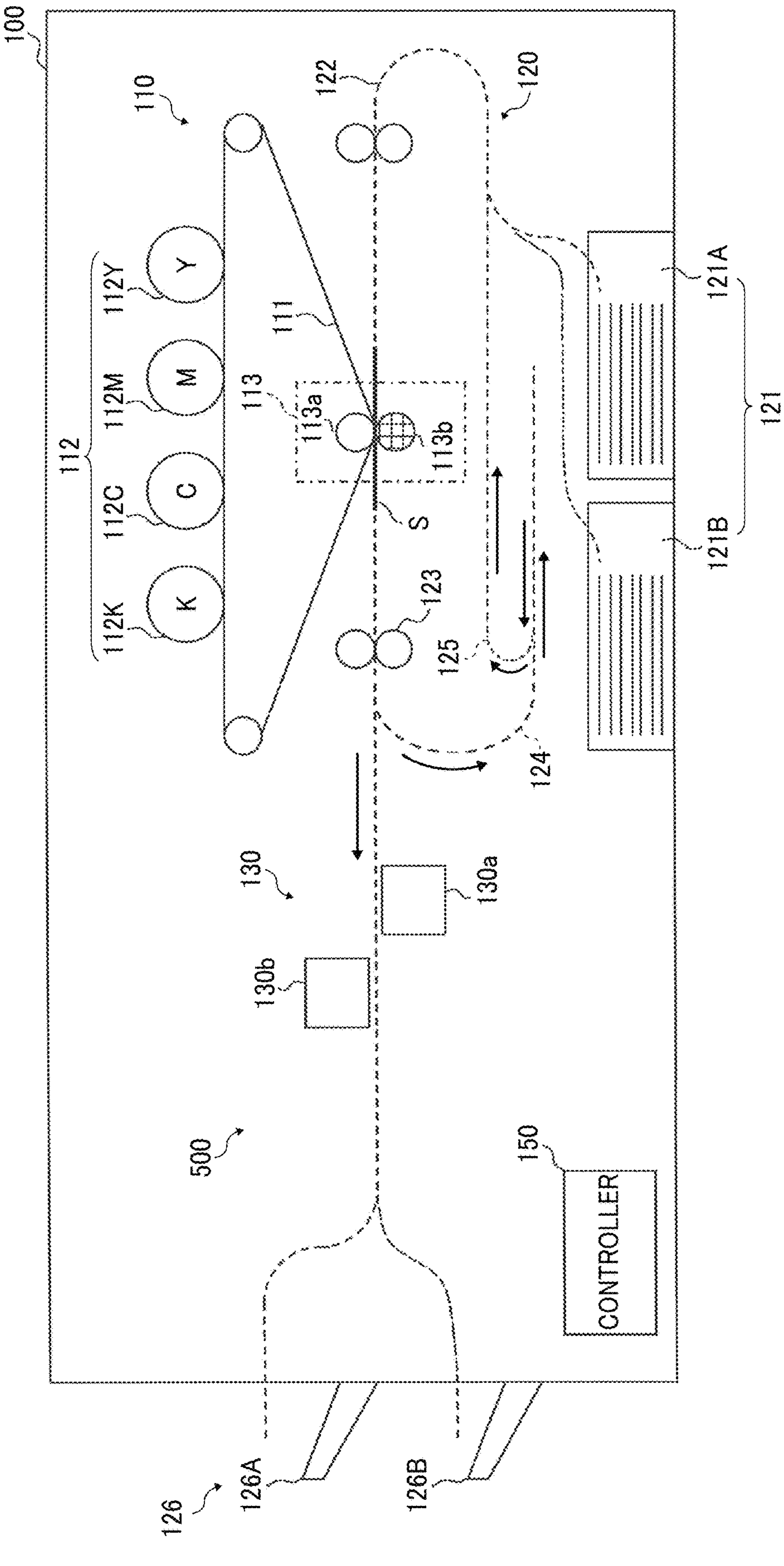
FIG. 1 is a diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Descriptions are given of an image reading device and an image forming apparatus according to an embodiment of the present disclosure, with reference to the following figures. In the present embodiment, the image reading device and the image forming apparatus according to the present embodiment achieve an abnormality detection function, for example, using a reader such as an inline sensor. In short, the image reading device and the image forming apparatus according to the present embodiment incorporating the image reading device scan a print sample having an actual defective image and set the threshold value for abnormality determination using the defective image, so as to achieve an abnormality image detection function at the level expected by a user in actual detection. Descriptions are given of the features of an image reading device and an image forming apparatus including the image reading device according to the present disclosure, with reference to the drawings.

FIG. 1 is a diagram illustrating a schematic view of a configuration of an image forming apparatus 100 according to the present embodiment.

An image forming apparatus 100 includes an image forming device 110, a medium conveyor 120, an image reader 130, and a controller 150. The controller 150 controls the overall operation of the image forming apparatus 100.

Figure 2:
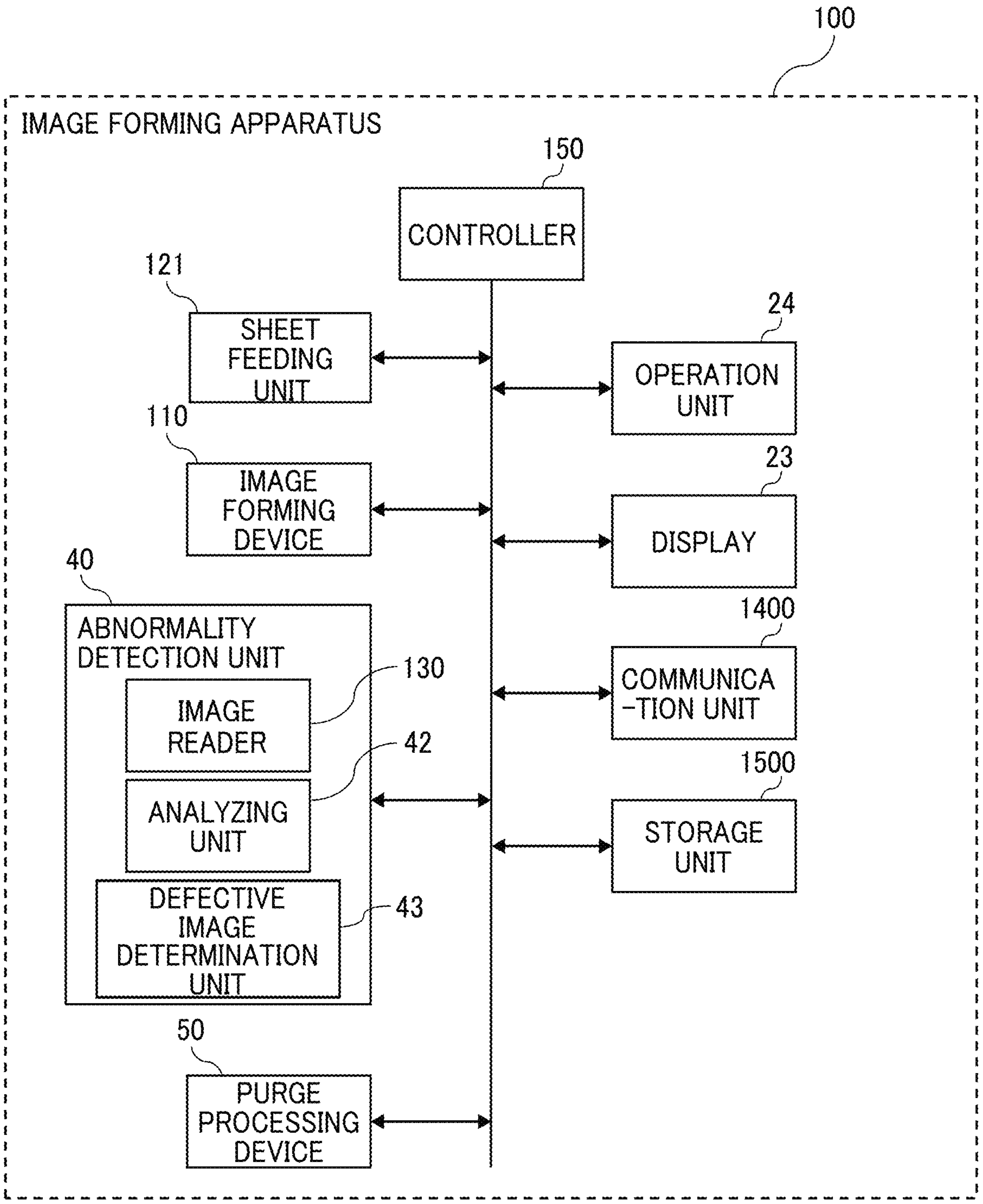
FIG. 2 is a control block diagram of the image forming apparatus according to the present disclosure.

FIG. 2 is a control block diagram of the image forming apparatus 100 according to the present disclosure.

As illustrated in FIG. 2, the controller 150 divides the blocks for each function and connected to a sheet feeding unit 121, the image forming device 110, an abnormality detection unit 40, an operation unit 24, a display 23, a communication unit 1400, a storage unit 1500, and a purge processing unit 50. The controller 150 includes devices such as a central processing unit (CPU) and a random access memory (RAM), reads various programs from the storage unit 1500, and controls each unit.

Each of the operation unit 24 and the display 23 is a user interface mounted on the top of the image forming apparatus 100 illustrated in FIG. 1. The operation unit 24 generates an operation signal in accordance with an operation by a user (manual instruction) and outputs the operation signal to the controller 150. The operation unit 24 may include, e.g., a keypad and a touch panel integrally formed with the display 23.

The display 23 displays an operation screen in accordance with an instruction from the controller 150. The display 23 may include, e.g., a liquid crystal display (LCD) or an organic electro luminescence display (OELD).

The communication unit 1400 transmits and receives data to and from an external device connected to a communication network.

The storage unit 1500 stores, e.g., a program readable by the controller 150 and data used at the time of executing the program. The storage unit 1500 may include, e.g., a hard disk and a nonvolatile semiconductor memory.

The sheet feeding unit 121 includes multiple sheet feed trays 121A and 121B, each containing sheets specified in a job. Each sheet is fed from a corresponding one of the multiple sheet feed trays 121A and 121B to supply the sheet to the image forming device 110. The abnormality detection unit 40 includes the image reader 130, an analyzing unit 42, and a defective image determination unit 43. The abnormality detection unit 40 reads an image by the image reader 130, analyzes the image by the analyzing unit 42, and determines whether the image has a defect, in other words, whether the image has image abnormality, by the defective image determination unit 43. An image reading device 500 includes, e.g., the image reader 130 and the defective image determination unit 43 included in the abnormality detection unit 40, the operation unit 24, and the controller 150.

The image forming device 110 in FIG. 1 includes photoconductor drums 112 for forming latent images corresponding to images of respective colors. To be more specific, the photoconductor drums 112 are the photoconductor drums 112Y, 112M, 112C, and 112K disposed so as to correspond to an image forming process using toners of yellow (Y), magenta (M), cyan (C), and black (K), which are image forming materials (for example, toners) of the respective colors.

The photoconductor drums 112Y, 112M, 112C, and 112K are disposed along an intermediate transfer belt 111 that is an endless belt included in a movement assembly. The intermediate transfer belt 111 is wound around at least one drive roller and a plurality of driven rollers, and moves between a primary transfer position where an image (toner image) developed on the photoconductor drum 112 (i.e., photoconductor drums 112Y, 112M, 112C, and 112K) is transferred and a secondary transfer position where the image (toner image) is transferred to the sheet S.

A transfer device 113 is disposed at the secondary transfer position. The transfer device 113 includes a transfer roller 113*a* and a counter roller 113*b* that is disposed facing the transfer roller 113*a*. In the transfer device 113, the toner image is transferred from the intermediate transfer belt 111 to the sheet S to form an image at a predetermined position (i.e., image forming position) on the sheet S. A gap is provided between the transfer roller 113*a* and the counter roller 113*b*, so that the intermediate transfer belt 111 and the sheet S pass through the gap while being nipped between the transfer roller 113*a* and the counter roller 113*b*. An image is transferred onto the sheet S while the sheet S is nipped in the gap between the transfer roller 113*a* and the counter roller 113*b* and conveyed in the conveyance direction of the sheet S (sub-scanning direction).

The medium conveyor 120 includes the sheet feeding unit 121 (sheet feed trays 121A and 121B), a conveyance passage 122, a fixing roller pair 123, a conveyance passage switcher 124, and a reversal passage 125. Each of the sheet feed trays 121A and 121B contains the sheet S (sheets S). The conveyance passage 122 is defined by multiple roller pairs to convey the sheet S. The fixing roller pair 123 is disposed downstream from the transfer device 113 in the conveyance direction of the sheet S.

When the image forming process is performed, under the predetermined control process by the controller 150, the sheet S loaded in the sheet feed tray 121A is separated by, e.g., a pickup roller and conveyed along the conveyance passage 122. Then, the sheet S reaches the transfer device 113.

As the sheet S reaches the transfer device 113, the transfer process is performed. That is, the sheet S is conveyed in the predetermined conveyance direction of the sheet S while being nipped between the surface of the intermediate transfer belt 111 and the counter roller 113*b*. The transfer roller 113*a* biases (presses) the intermediate transfer belt 111 toward the counter roller 113*b*. When the sheet S passes between the intermediate transfer belt 111 and the counter roller 113*b*, an image forming material on the surface of the intermediate transfer belt 111 is transferred onto the sheet S. In this transfer process, an image is formed on one side (first face) of the sheet S.

The sheet S having the image on the first face is further conveyed, so that the image is fixed to the sheet S by the fixing roller pair 123. Then, the sheet S is conveyed to the conveyance passage switcher 124 disposed downstream from fixing roller pair 123 in the conveyance direction of the sheet S. Then, the travel direction of the sheet S is reversed in the conveyance passage switcher 124. The sheet S is then conveyed to the reversal passage 125. Thereafter, the sheet S is conveyed again to the transfer position of the transfer roller 113*a* so that the image formed on the intermediate transfer belt 111 is transferred onto the second face of the sheet S.

The sheet S having the image on the second face is further conveyed, so that the image on the second face of the sheet S is fixed to the sheet S by the fixing roller pair 123. Then, the sheet S is conveyed to the image reader 130 disposed downstream from the fixing roller pair 123 in the conveyance direction of the sheet S.

The image reader 130 includes readers 130*a* and 130*b*. The reader 130*a* reads the first face of the sheet S. The reader 130*b* reads the second face of the sheet S. The sheet S that has passed through the image reader 130 is ejected to a sheet ejection unit 126 including multiple sheet ejection trays 126A and 126B. To be more specific, the sheet S is ejected to a corresponding one of the sheet ejection trays 126A and 126B.

Figure 3:
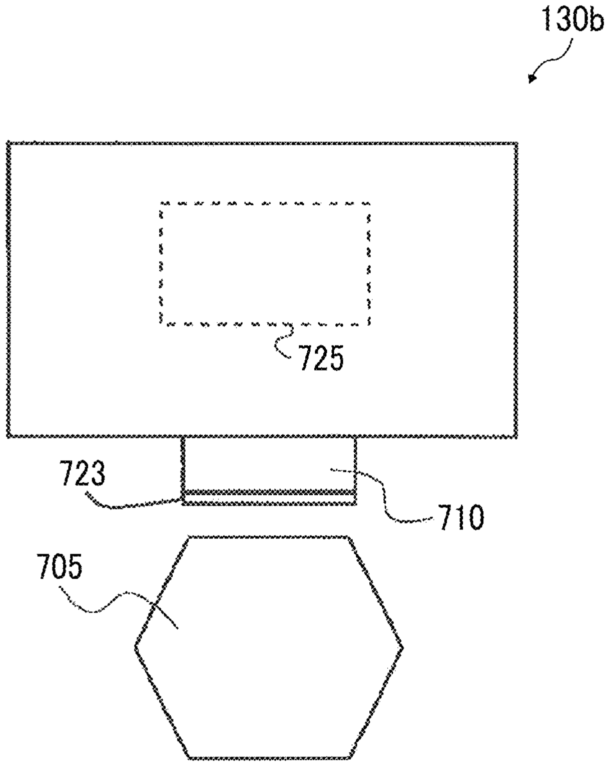
FIG. 3 is a diagram illustrating an example of a configuration of a reader of an image reader included in the image forming apparatus.

FIG. 3 is a diagram illustrating an example of a configuration of a reader of an image reader 130 included in the image forming apparatus 100.

As illustrated in FIG. 3, the reader 130*b* includes a reading unit 710 and a line image sensor. The reading unit 710 irradiates a sheet S with light when the sheet S passes through a reading position. The line image sensor includes multiple imaging elements 725 that perform photoelectric conversion for each pixel. The imaging elements 725 are disposed in a one-dimensional shape along the width direction of the sheet S. The reader 130*b* repeatedly performs a reading operation of an image for one line extending in the width direction in accordance with a passing operation of the sheet S that passes the reading position, so as to read the image printed on the sheet S as a two-dimensional image. After this operation, the analyzing unit 42 of the abnormality detection unit 40 analyzes the image, and then the defective image determination unit 43 of the abnormality detection unit 40 determines whether the image is a defective image.

Each of the multiple imaging elements 725 is an optical sensor that performs a reading operation on an image formed on the sheet S at the reading position.

The background switching revolver 705 is disposed at a position facing the reader 130*b* across the conveyance passage to reflect irradiation light with which the sheet S is irradiated when the image on the sheet S is read.

The reading unit 710 includes an exposure glass 723 disposed facing the background switching revolver 705. The exposure glass 723 penetrates light emitted from the reading unit 710 and reflected light returning after the emitted light is reflected by the background switching revolver 705 or the sheet S.

Note that the reader 130*a* has the substantially identical structure to the reader 130*b* and includes the reading unit 710 and the imaging element 725. Different from the reader 130*b*, the reading unit 710 and the imaging elements 725 of the reader 130*a* are disposed vertically opposite with respect to the background switching revolver 705 across the conveyance passage. To be more specific, the background switching revolver 705 is disposed above the conveyance passage and the reading unit 710 and the imaging element 725 of the reader 130*a* are disposed below the conveyance passage.

Figure 4:
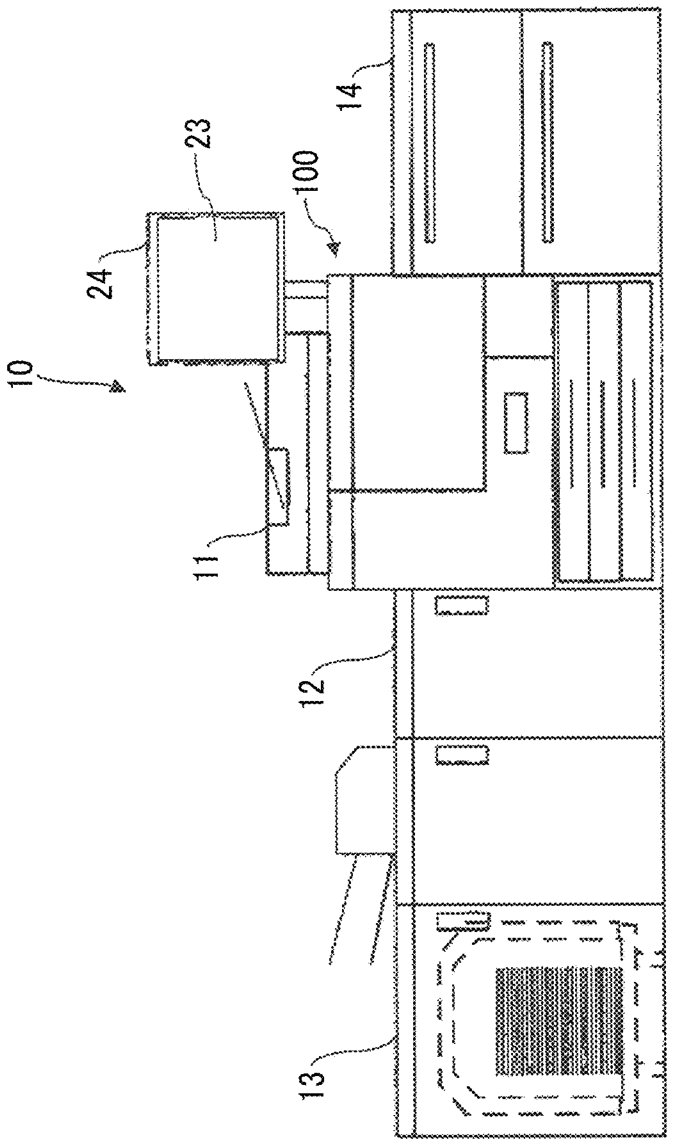
FIG. 4 is a diagram illustrating a configuration of an image forming system including the image forming apparatus of FIG. 1.

The image forming apparatus 100 illustrated in FIG. 1 may be applied to, for example, an image forming system 10 illustrated in FIG. 4.

FIG. 4 is a diagram illustrating a configuration of the image forming system 10 including the image forming apparatus 100 of FIG. 1.

The image forming system 10 includes the image forming apparatus 100, an inline sensor unit 12, a sheet ejection unit 13, and a sheet feeding unit 14. The image forming apparatus 100 forms an image on a sheet fed from the sheet feeding unit 14 and ejects the sheet toward the inline sensor unit 12. The inline sensor unit 12 is disposed downstream from the image forming apparatus 100 in the conveyance direction of the sheet S to inspect the sheet S ejected from the image forming apparatus 100. The sheet ejection unit 13 is disposed downstream from the inline sensor unit 12 in the conveyance direction of the sheet S to receive the sheet that has passed through the inline sensor unit 12 and sequentially stack multiple sheets S ejected from the inline sensor unit 12. In the image forming system 10 illustrated in FIG. 4, the sheet feeding unit 14 is disposed upstream from the image forming apparatus 100 in the conveyance direction of the sheet S to contain a large number of sheets to be fed to the image forming apparatus 100. In the image forming system 10 having such a configuration, abnormality detection is performed on an image read by the inline sensor unit 12. An image read from an automatic document feeder (ADF) or a scanner 11 is used as an image used for setting a threshold value of abnormality detection in the abnormality detection. Further, the image forming apparatus 100 includes an operation unit (control panel) 24 having a display 23 for setting and displaying a threshold setting mode for defective image detection that is described below.

Figure 5:
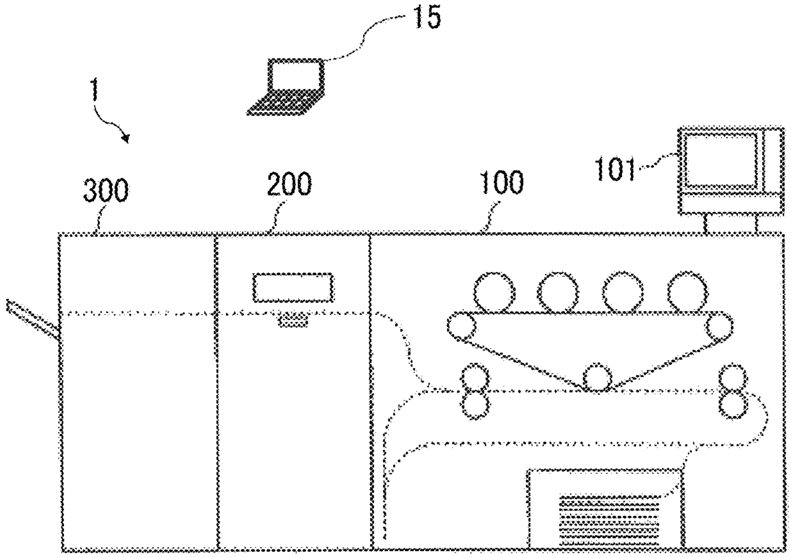
FIG. 5 is a diagram a diagram illustrating another example of a configuration of an image forming system including the image forming apparatus of FIG. 1.

Further, the configuration of the image forming apparatus 100 may be applied to an image forming system 1 that is not provided with a scanner mounted on the housing of the image forming apparatus 100, as illustrated in FIG. 5.

FIG. 5 is a block diagram illustrating an example of a hardware configuration of the image forming system 1 including the image forming apparatus 100 on which a scanner is not mounted.

As illustrated in FIG. 5, the image forming system 1 includes the image forming apparatus 100, a medium position detection device 200, and a stacker 300. The image forming apparatus 100 includes an operation unit 101 that is similar to the operation unit 24 illustrated in FIG. 4, an image forming device, a transfer belt, a secondary transfer roller, a sheet feeding device, a conveyance roller pair, a fixing roller, and a reversal passage provided in an image forming apparatus that is similar to the image forming apparatus 100 illustrated in FIG. 1. Even in such an apparatus (image forming apparatus 100), the threshold value for defective image detection may be set based on, for example, an image read by another apparatus as illustrated in FIG. 5, so that the read image can be used to determine the threshold value for defective image detection.

Next, a description is given of a detection threshold setting mode of defective image detection according to the present embodiment.

Figure 6:
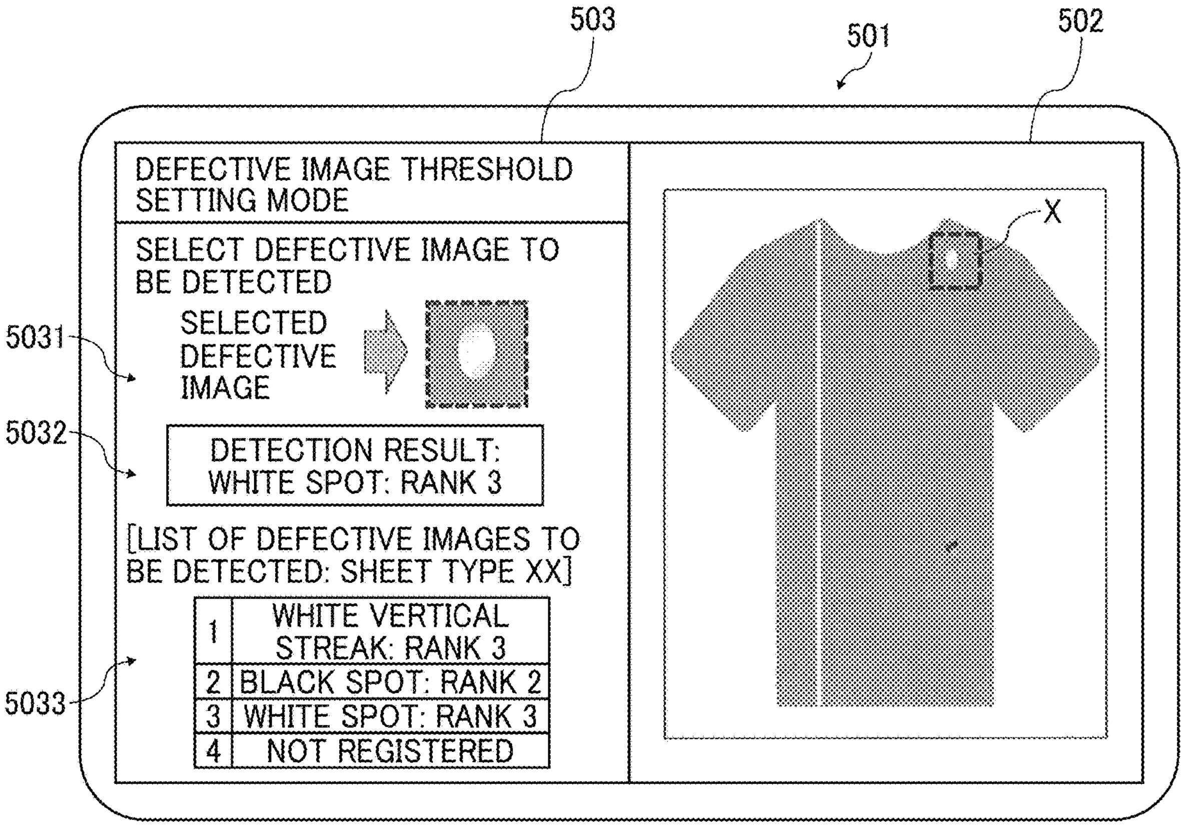
FIG. 6 is a diagram illustrating an example of a screen set in a detection threshold setting mode of a defective image (detection threshold setting screen) according to an embodiment of the present disclosure.

FIG. 6 is a diagram illustrating an example of a screen set in a detection threshold setting mode of a defective image (detection threshold setting screen) according to an embodiment of the present disclosure.

FIG. 5 illustrates an example of a detection threshold setting screen displayed in a detection threshold setting mode of defective image detection on the operation unit 24 (display 23) illustrated in FIG. 4, the operation unit 101 illustrated in FIG. 5, or the display screen of a personal computer (PC) 15. The PC 15 is a typical information processing device that is electrically connected to the image forming apparatus 100.

As illustrated in FIG. 6, a detection threshold setting screen 501 includes a read image displaying area 502 and a defective image threshold setting area 503. The read image displaying area 502 displays an image read by the image reader 130. The defective image threshold setting area 503 is an area to set the defective image threshold value for determining that the read image has a defective image portion. In the detection threshold setting screen 501, defective image information and defect type information are set based on the image on a sheet read by the image reader 130. The defective image information is, for example, an image read by the image reader 130. The defect type information is, for example, the type of the defective image portion included in the image and the threshold or rank indicating the degree of abnormality. Further, as illustrated in FIG. 6, the defective image threshold setting area 503 includes a selection area 5031, a determination result area 5032, and a registration content display area 5033. The selection area 5031 displays a defective image portion selected from the read image. The determination result area 5032 displays the determination result indicating the degree of abnormality of the selected defective image portion. The registration content display area 5033 associates the type of the selected defective image portion with the rank indicating the threshold value of the degree of abnormality. For example, in response to a touch operation by a user on the operation panel, the controller 150 displays an area of a predetermined range including the position on the screen at which the touch operation is received, in the selection area 5031. In FIG. 6, an area X is selected as a defective image portion by the user, in the image displayed in the read image displaying area 502 and is displayed in the selection area 5031.

Further, the controller 150 determines the type and the degree (level) of abnormality of the defective image portion displayed in the selection area 5031 illustrated in FIG. 6. For example, the controller 150 determines whether the abnormality of the defective image portion is any of a white spot, a black spot, or a white vertical streak. The determination method may analyze a defective image portion using a known image analysis technique. Then, when the result of the analysis satisfies a condition such as a predetermined threshold value specified for each type, the determination method may determine that the image is a defective image portion of the type. In addition, the method of determining the degree of abnormality may be determined in stages according to the rate of deviation from the predetermined threshold value. For example, as the rate of deviation from the predetermined threshold value increases, the degree of abnormality of the type become greater (higher). The controller 150 displays the result of the determination in the determination result area 5032.

Then, the controller 150 stores the type of the defective image portion displayed in the determination result area 5032 and the degree of abnormality in association with each other in the storage unit 1500 such as a memory. The registration content display area 5033 in FIG. 6 indicates that the controller 150 stores the type of the abnormal image portion "white spot" and the degree of abnormality "rank 3" in association with each other and registers them in the image forming apparatus 100. The registration content display area 5033 in FIG. 6 also displays the types of defective image portions registered in the past and the degrees of image abnormality in a list format.

Since a defective image to be detected differs depending on a user, as described above, an image read by the image reader 130 is displayed in the read image displaying area 502 of FIG. 6, and a defective image portion is selected from the area to be registered. After the user has selected a defective image portion, the controller 150 determines the type and rank (level of image abnormality) of the defective image portion, and then registers the defective image portion in the registration content display area 5033 as an image abnormality list. After the controller 150 has registered the type and rank of the defective image portion in association with each other, the type and rank of the defective image portion are displayed as the registered combination in the image abnormality list in the registration content display area 5033. As the user selects the registered combination, the defective image portion is set. At this time, one or more defective image portions displayed in the image abnormality list may not be selected from an image of one print sample. For example, the controller 150 may store a defective image portion determined among images of a plurality of print samples previously read in the past in association with a rank that corresponds to a threshold value, in a storage unit such as a memory, so that the controller 150 reads and sets the defective image portion or sets a new rank obtained by changing the threshold value of the read rank. As described above, the defective image portion in the past and the rank are read to be settable or changeable. By so doing, a new rank is determined with reference to the defective image portion previously determined.

The image abnormality list may be set for each sheet type. For example, uneven sheet tends to cause unevenness, thin paper tends to cause skew, and thick paper tends to cause shock jitter. In order to address these inconveniences, a user may designate a sheet type having a particularly high frequency of occurrence of a defective image portion, on the screen, so that the controller 150 may register the above-described combination with respect to the designated sheet type, in the image abnormality list.

Figure 7A:
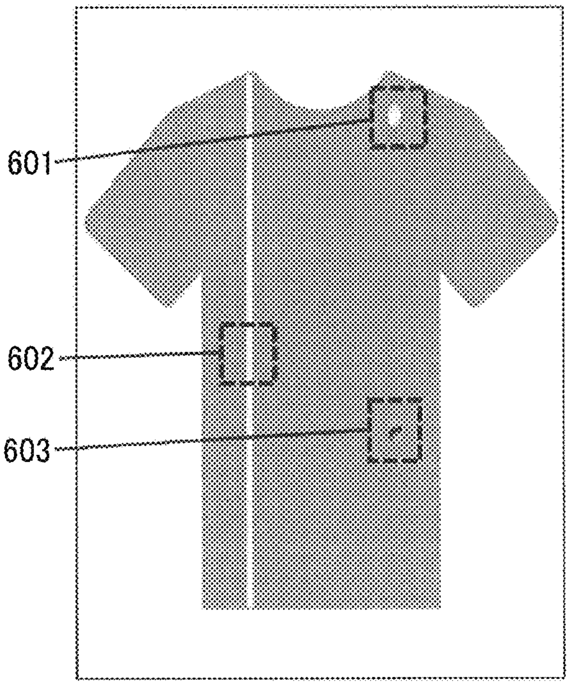
FIG. 7A is a diagram illustrating an image read by the reader.
Figure 7B:
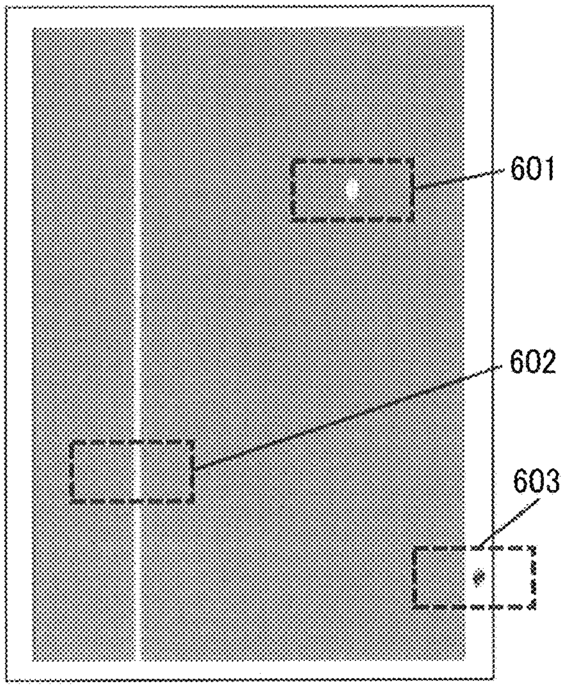
FIG. 7B is a diagram illustrating an image read by the image reading device and defective image portions in the image.

Next, a description is given of the defective image portion illustrated in FIG. 6, with reference to FIGS. 7A and 7B.

FIG. 7A is a diagram illustrating an image read by the image reader 130 (readers 130*a* and 130*b*).

FIG. 7B is a diagram illustrating an image read by the image reader 130 (readers 130*a* and 130*b*) and defective image portions in the image.

As described with reference to FIGS. 7A and 7B, it is likely that the image read by the image reader 130 includes various defective image portions such as a white spot 601, a vertical white streak 602, and a black spot 603. Therefore, these defective image portions are to be detected and removed from the image to be output. The thickness, size, and range of such defective image portions, in other words, the thickness, size, and range of a portion to be abnormal (defective) vary depending on the request of a user who uses the image forming apparatus. Further, an image of the defective image portion included in a typical test image that is not generated based on an actual read image may differ from an image that is read actually by the image reader 130. Therefore, as described above, the level of image abnormality detection is set based on the actual read image. As a result, a defective image (image abnormality) is detected with accuracy in accordance with a request from each user.

Figure 8A:
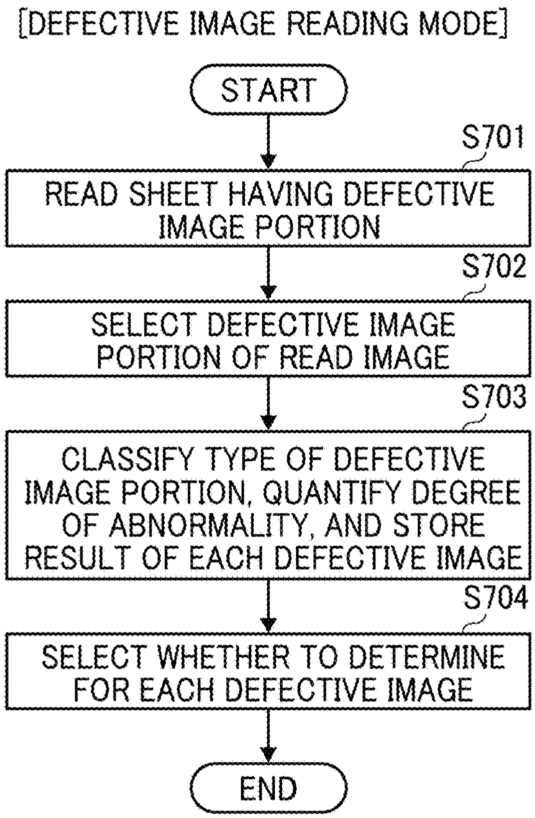
FIG. 8A is a flowchart of a process procedure of reading a defective image executed in a defective image reading mode in which a defective image is read.
Figure 8B:
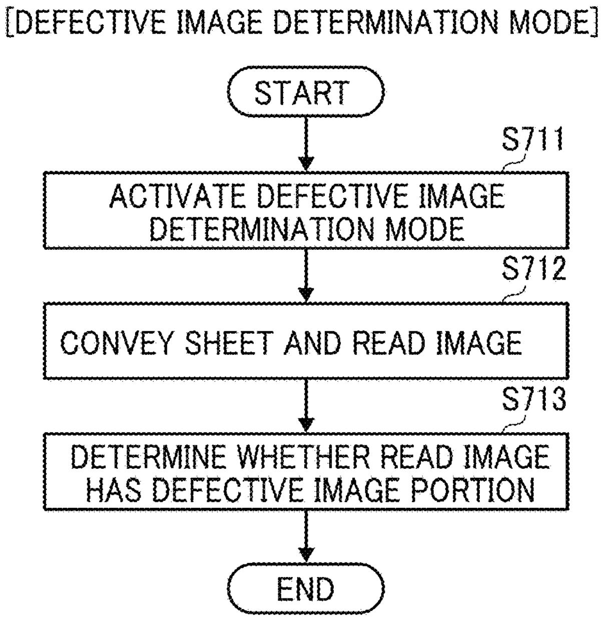
FIG. 8B is a flowchart of a process procedure of determining the defective image executed in a defective image determining mode in which the defective image is determined.

FIGS. 8A and 8B are flowcharts of respective process procedures of a defective image reading mode in which a defective image is read and a defective image determination mode in which the defective image is determined.

FIG. 8A is a flowchart of a defective image reading process executed in a mode of reading a defective image.

FIG. 8B is a flowchart of a defective image determining process executed in a mode of determining image abnormality.

The flowcharts of FIGS. 8A and 8B are described with reference to FIG. 6. As illustrated in FIG. 8A, in the defective image reading process, the image reader 130 reads a sheet that is a reading object having a defective image portion by a user, and outputs the image on the sheet read by the image reader 130 (step S701). In other words, the controller 150 causes the image reader 130 to read the printed portion of the defective image on the sheet and output the sheet having the defective image portion (image abnormality). Subsequently, the controller 150 displays the read image on the sheet in the read image displaying area 502 of the detection threshold setting screen 501, and then receives the selection of the defective image portion from the user (step S702). The controller 150 displays the defective image portion selected by the user in the selection area 5031 of the defective image threshold setting area 503. In addition, the controller 150 associates the type of the selected defective image portion in association with the rank indicating the degree of image abnormality, and then causes the operation unit 24 (display 23), the operation unit 101, or the display screen of the PC 15 to display the result, so as to receive the user's input in the registration content display area 5033 (step S703). As a result, the controller 150 displays the determination result including the degree of image abnormality of the selected defective image portion, in the determination result area 5032. The controller 150 further receives the selection of another defective image portion from the user (step S704). Thereafter, the processing of S702 and S703 is repeated until an end instruction is received from the user.

In FIG. 8B, the controller 150 activates a defective image determination mode for determining a defective image portion based on the type and the rank of the defective image portion set in the defective image threshold setting area 503 (step S711). After step S711, the image reader 130 reads an image on a sheet (step S712), and then the controller 150 determines a defective image portion based on the type and rank of the defective image portion set in the defective image threshold setting area 503 (step S713).

Figure 9:
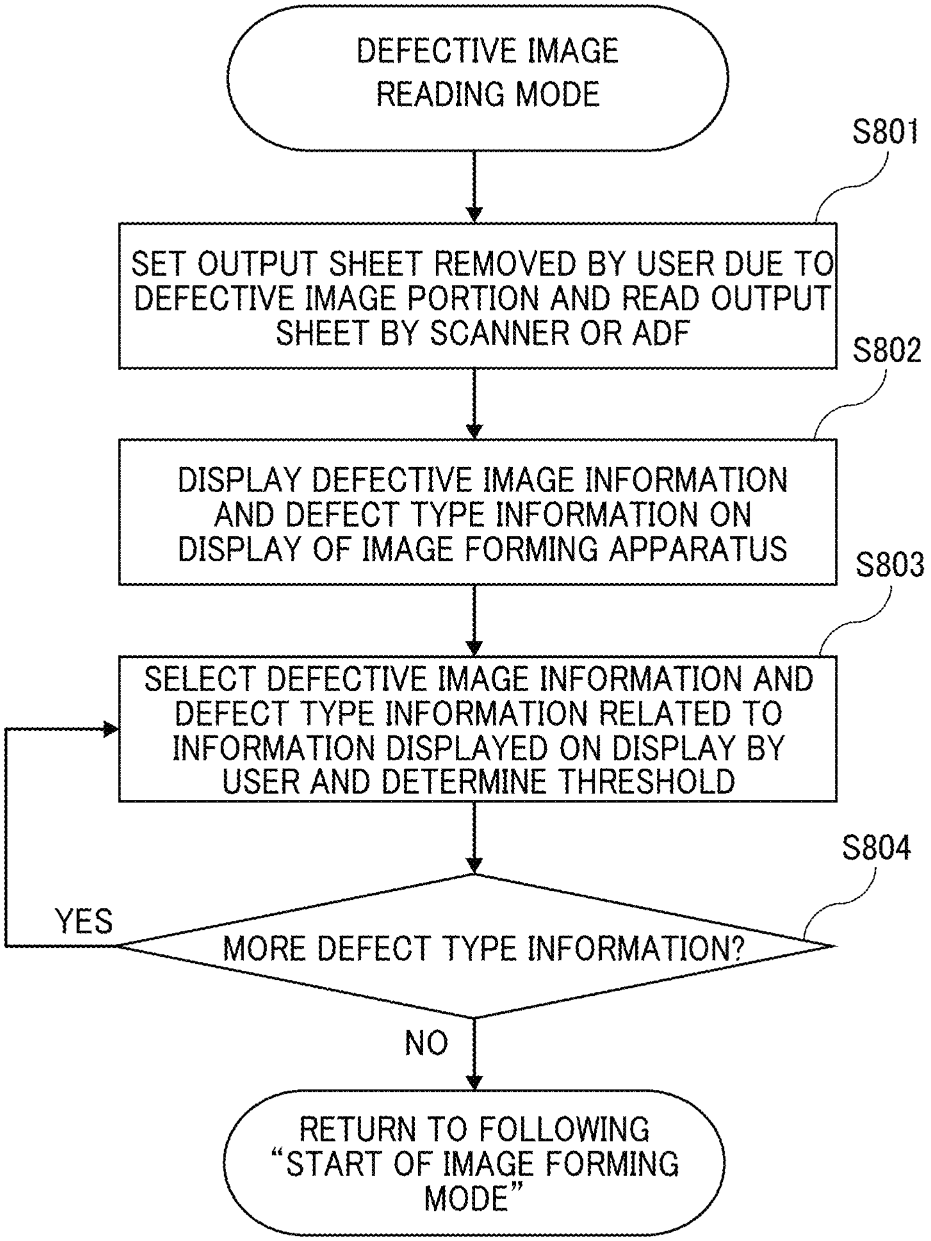
FIG. 9 is a flowchart of a process of the image forming apparatus according to a first embodiment of the present disclosure.

FIG. 9 is a flowchart of a process of the image forming apparatus 100 according to a first embodiment of the present disclosure.

Now, a description is given of the detailed process of the image forming apparatus 100 with reference to the flowchart of FIG. 9, in connection with handling of a sheet with an image abnormality occurred due to the overall operation of the image forming apparatus 100. In the defective image reading mode, when the sheet that is a reading object determined to have a defective image portion is set by a user on a scanner such as the scanner 11 or an ADF, the image reader 130 reads the sheet, and then outputs the image on the sheet read by the scanner 11 or the ADF (step S801). Subsequently, the controller 150 causes the operation unit 24 (display 23), the operation unit 101, or the display screen of the PC 15 to display the read image on the sheet in the read image displaying area 502 of the detection threshold setting screen 501 (step S802). In other words, and then receives the selection of the defective image portion from the user (step S803). The controller 150 displays the defective image portion selected by the user in the selection area 5031 of the defective image threshold setting area 503. In addition, the controller 150 associates the type of the selected defective image portion in association with the rank indicating the degree of image abnormality, and then causes the operation unit 24 (display 23), the operation unit 101, or the display screen of the PC 15 to display the result, so as to receive the user's input in the registration content display area 5033 (step S803). As a result, the controller 150 displays the determination result including the degree of image abnormality of the selected defective image portion, in the determination result area 5032. The controller 150 further determines whether there is another defective image portion determined by the user, in other words, whether there is another piece of defect type information (step S804). When there is another piece of defect type information (YES in step S804), the process procedure returns to step S803 to receive selection of the determination result of each defective image portion. On the other hand, when the controller 150 processes the whole pieces of type information and completely registers the defective image portions, in other words, there is no more piece of type information (NO in step S804), the process returns to an image forming mode.

As illustrated in FIG. 9, the image reader 130 reads the image having a defective image portion in which an image abnormality actually occurs, and the controller 150 sets a determination threshold value corresponding to the type of a defective image portion as a degree of the defective image portion used when the controller 150 determines that the image has an abnormality, according to the input of the user's selection. When reading an image including a defective image portion, an image that is read using a flatbed scanner or an ADF is used to obtain a highly accurate image. Alternatively, an image that is read using an inline sensor may be used. The controller 150 extracts the defective image portion to be detected as an image having an abnormality, from the image read by the image reader 130. Then, the controller 150 classifies the type of the defective image portion (e.g., vertical streak, white spot, black spot), quantifies the degree of abnormality for each defective image, and causes the storage unit to store the result as a threshold for determining the defective image as a defective image or an image having an abnormality.

In the above-described example, a user determines the type of the defective image portion. However, the controller 150 may compare models of various types of defective image portions stored in advance in a storage unit such as a memory, with the defective image portion read by the image reader 130, determine that the defective image portion is of a specific type when a predetermined condition is satisfied, and cause the storage unit to store the type of the defective image portion in association with the rank of the defective image portion, based on the determination result. Specifically, when the predetermined condition is satisfied, that is, when a defective image portion of the model and a defective image portion that is actually read at the time of setting have indexes including a value representing an image, e.g., a pixel value or a luminance value on an image and a shape and size of a defective image portion, close to each other by a predetermined threshold or more, the controller 150 may determine that the defective image portion of the model is the same type as the defective image portion actually read. Thereafter, the controller 150 receives, from the user, an input of the abnormality level of the image determined to be a defective image portion of the same type. The level of the abnormality may not be input by a user. For example, the controller 150 may automatically set the level of the abnormality in accordance with the indexes including a value representing an image, e.g., a pixel value or a luminance value on an image and a shape and size of a defective image portion, as in the above description.

As illustrated in the flowchart of FIG. 8B, when the type of the defective image portion and the threshold value indicating the level of the defective image portion are set, the defective image determination mode ends and the image forming operation is started again.

As described above, in the present embodiment, after a user reads a sheet on which an image having actual image abnormality, and then determines image abnormality for setting a defective image, based on the defective image portion included in the image on the sheet that is actually read. For example, an image reading device (for example, the image reading device 500) includes an image reader (for example, the image reader 130) and a defective image determination unit (for example, the defective image determination unit 43). The image reader is configured to read an image on a recording medium (for example, the sheet S) to be conveyed. The defective image determination unit is configured to obtain defective image information (for example, an image read by the image reader 130) and defect type information (for example, the type of the defective image portion included in the image, the threshold or rank indicating the degree of the abnormality) based on the image on the recording medium read by the image reader, and then determine an abnormality of the image on the recording medium. According to such a configuration, the defective image is accurately determined for each image data of the user. Typical image reading devices detect the abnormality level set in advance in each device or output a test image for resetting the level of the defective image, so as to set the abnormality level based on the test image. However, such typical image reading devices set a constantly occurring defective image alone, and therefore a defective image at the level at which a user can recognize the abnormality cannot be set as a threshold value at an actual image level. Further, a threshold value for determining a defective image portion with respect to the defective image such as an image with spots (voids) suddenly generated cannot be set. However, in the present embodiment, a threshold value for determining a defective image is set using an image in which an abnormality has occurred when the user has actually read the image, instead of the test image as described above. Therefore, a defective image is accurately determined for each image data of the user.

In addition, as illustrated in FIG. 6, the defective image determination unit (for example, the defective image determination unit 43) compares the image read by a scanner that is an internal or external reading unit electrically connected to the image abnormality determination unit, with the defect type information, and determines whether the image on the recording medium read by the reading unit is a defective image. The circuitry (for example, the controller 150) outputs the determination result on a display, and then sets the defect type information. As a result, an image used for determining a defective image portion is set from a medium such as a sheet that is actually read by the user, and therefore the original image is captured by the scanner (or the ADF).

Further, as illustrated in FIGS. 4 and 5, the image reading device further includes an operation unit (for example, the operation unit 24, the operation unit 101) and the controller 150. The operation unit includes a screen (for example, the detection threshold setting screen 501) to receive an input. A user inputs an instruction through the screen. The defective image determination unit (for example, the defective image determination unit 43) compares the value specified via the screen by the user, with the defect type information, and determines whether the image on the recording medium read by the reading unit is a defective image. The controller 150 outputs (displays) the determination result of the abnormality of the image on the recording medium on the screen, and then sets the defect type information. Due to such a configuration, the defect type information is set in accordance with the user's intention.

Further, as illustrated in FIG. 6, the defective image determination unit (for example, the defective image determination unit 43) determines the defective image portion of the image having an abnormality, out of the images of the media read by the image reader (for example, the image reader 130), and the controller 150 sets the defect type information about the defective image portion. Due to such a configuration, the defect type information is set for a defective image portion that the user determines as an image having abnormality.

The image reading device (for example, the image reading device 500) further includes an operation unit (for example, the operation unit 24, the operation unit 101) and the controller 150. The operation unit includes a screen through which an instruction is received from a user. The defective image determination unit (for example, the defective image determination unit 43) causes the operation unit to display the defective image portion on the screen, and then determines the defective image portion displayed on the screen with a threshold value specified by the user on the screen. The controller 150 sets the defect type information. Due to such a configuration, the user selects the defective image portion on the screen, and then set the defect type information.

Further, the defective image determination unit 43 may set the defect type information based on an image read by an external reader connected via a network. Accordingly, for example, multiple image reading units disposed respective locations apart from each other set the defect type information using a user's image shared between the multiple image reading units. Due to such a configuration, the defective image portion is determined based on the same standard, thereby equalizing, that is, making the image quality uniform.

Figure 10:
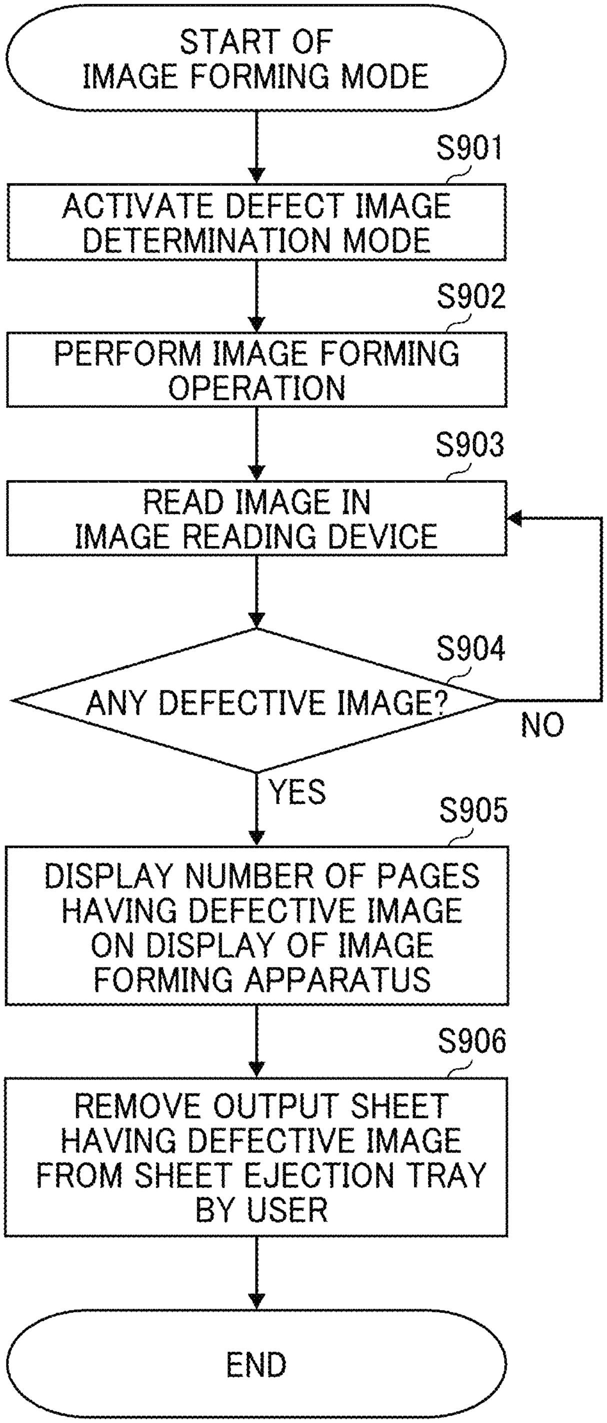
FIG. 10 is a flowchart of a process of the image forming apparatus according to a second embodiment of the present disclosure.

Further, FIG. 10 is a flowchart of a process of the image forming operation of the image forming apparatus 100 according to a second embodiment of the present disclosure.

As described in the flowchart of FIG. 10, as the image formation mode is initiated, the defective image determination mode is turned on (step S901). Then, the image forming operation starts (step S902), and the controller 150 causes the image reader to execute reading (step S903). The image reader counts the number of output pages of the recording media, and the defective image determination unit 43 determines whether there is a defective image (step S904). When there is not a defective image (NO in step S904), the process returns to step S903 and repeats the processing of step S903 until a defective image is detected. When there is a defective image (YES in step S904), the controller 150 causes the display to display the number of output pages of the recording media including the image determined to be defective (step S905). As a result, in a case in which a sheet having an image abnormality and a normal sheet having no image abnormality are mixed in the destination of ejection (for example, in a case in which the destination of ejection is not switched from the image abnormality determination processing in time), the user grasps later about which page has the image abnormality, and then a print sample of a defective image is extracted (step S906).

Figure 11:
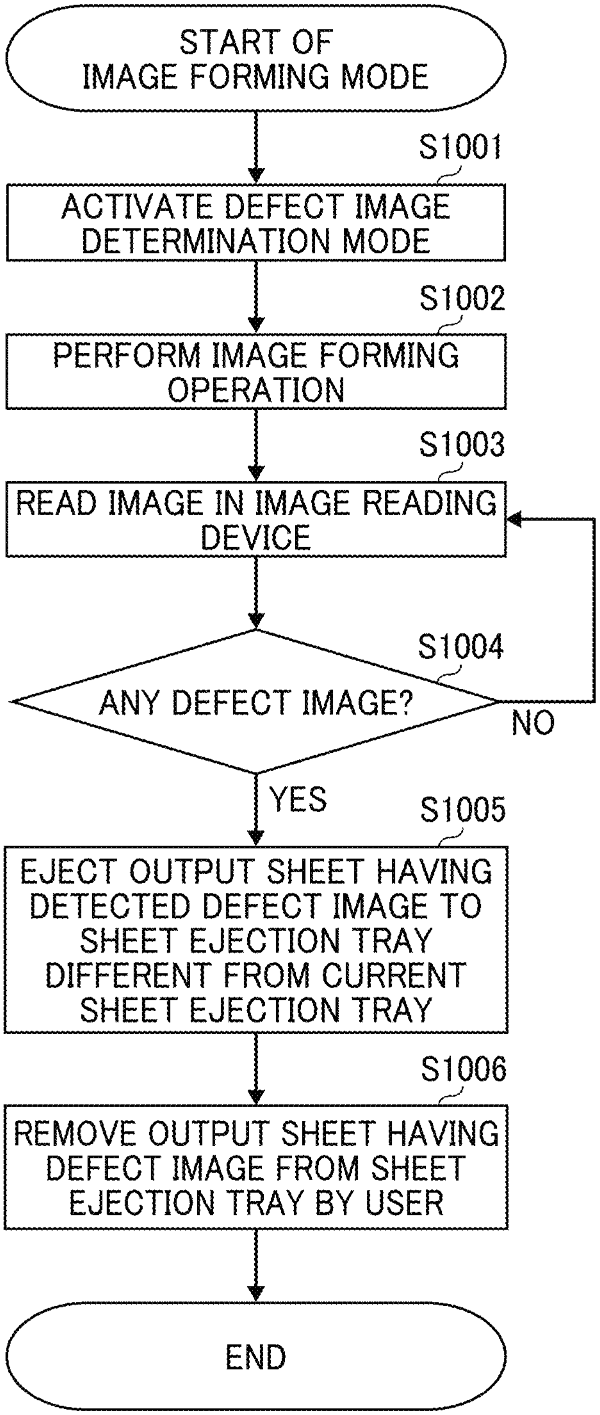
FIG. 11 is a flowchart of a process of the image forming apparatus according to a third embodiment of the present disclosure.

Further, FIG. 11 is a flowchart of a process of the image forming operation of the image forming apparatus 100 according to a third embodiment of the present disclosure.

As described in the flowchart of FIG. 11, as the image formation mode is initiated, the defective image determination mode is turned on (step S1001). Then, the image forming operation starts (step S1002), and the controller 150 causes the image reader to execute reading (step S1003). The defective image determination unit 43 determines whether there is a defective image (step S1004). When there is not a defective image (NO in step S1004), the process returns to step S1003 and repeats the processing of step S1003 until a defective image is detected. When there is a defective image (YES in step S1004), the controller 150 causes a purge processing unit 50 to purge the sheet having an image with an image abnormality and the sheet having the image without an image abnormality to respective destinations of ejection different from each other (step S1105). Specifically, when there is a defective image (YES in step S1004), a sheet having an image with no image abnormality is ejected to a destination of ejection that is different from the destination of ejection of the sheet having an image with an abnormality. For example, in the image forming apparatus 100 illustrated in FIG. 1, when an image is formed on a sheet and the sheet ejection tray 126B is specified as the destination of ejection of the printed sheet and the defective image determination unit 43 detects a defective image, the detected print sample having a defective image is ejected to the sheet ejection tray 126A. The user removes the print sample having a defective image from the sheet ejection tray 126A (step S1006).

As a result, the output product that is detected to be defective is distinguished from the normal product without an abnormality and is ejected to the destination of ejection different from the destination of ejection of the normal product.

Further, in FIG. 6, the image reader may read multiple images, the defective image determination unit 43 may display the defective image portion included in each of the images read by the image reader on the screen, and the controller 150 may set a value designated on the screen by the user as the defect type information for the displayed defective image portion. Due to such a configuration, the defect type information is set using the multiple images specified by the user.

Further, as described with reference to FIG. 6, the defective image determination unit 43 determines the abnormality of the image read by the image reader 130 for each type of the recording media. Thereafter, the controller 150 sets the defect type information for each sheet type based on the determination since the level or object of the abnormality detection may be different for each sheet type.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image reading device comprising:
an image reader configured to read an image on a recording medium; and
circuitry configured to:
obtain defective image information on the image read by the image reader;
receive an input of a portion of the image from a user, the portion of the image indicating a defective image portion of the defective image information;
determine defect type information based on the defective image portion;
determine an abnormality of the image on the recording medium based on the defective image information and the defect type information; and
determine a degree of the abnormality.

2. The image reading device according to claim 1, wherein the circuitry is configured to:
compare the image read by the image reader with the defect type information; and
determine whether the image read by the image reader is defective.

3. The image reading device according to claim 1, wherein the circuitry is configured to:
receive an input,
display, on a screen, a determination result of the abnormality of the image on the recording medium; and set a value displayed on the screen as the defect type information.

4. The image reading device according to claim 1, wherein the circuitry is configured to:
determine a defective image portion of the image read by the image reader, the defective image portion causing the image on the recording medium to be determined defective; and
set the defect type information of the defective image portion.

5. The image reading device according to claim 4, wherein the circuitry is configured to:
receive an input;
display the defective image portion on a screen; and
set the defect type information to a value displayed on the screen about the defective image portion.

6. The image reading device according to claim 5, wherein the image reader is configured to read a plurality of images, and
wherein the circuitry is configured to:
display, on the screen, a defective image portion included in each of the plurality of images read by the image reader;
compare the value displayed on the screen with the defect type information;
determine whether the defective image portion displayed on the screen is defective;
display a determination result of the defective image portion on the screen; and
set the defect type information.

7. The image reading device according to claim 1, wherein the circuitry is configured to cause the recording medium determined to have a defective image to be ejected to an ejection tray that is different from another ejection tray to which a recording medium having no defective image is ejected.

8. The image reading device according to claim 1, wherein the circuitry is configured to:
determine a number of output pages of recording media; and
display, on a display, a number indicating a number of output pages of recording media having respective defective images.

9. The image reading device according to claim 1, wherein the circuitry is configured to:
compare the abnormality of the image for each type of the recording medium read by the image reader, with the defect type information;
determine the abnormality of the image;
display the defect type information on a display; and
set the defect type information.

10. An image forming apparatus comprising:
an image forming device configured to form an image on a recording medium; and
the image reading device according to claim 1.

11. The image reading device according to claim 1, wherein the circuitry is configured to store the defect type information in association with the degree of abnormality.

12. The image reading device according to claim 11, wherein the circuitry is configured to store the defect type information and the degree of abnormality in association with a type of the recording medium.

13. The image reading device according to claim 1, wherein the circuitry is configured to determine the abnormality of the image based on a type of the recording medium.

14. The image reading device according to claim 1, wherein the image on the recording medium is not a test image.

15. The image reading device according to claim 1, wherein the circuitry is configured to display, on a display, a plurality of defect type information registered in the past associated with respective degrees of abnormality.

16. The image reading device according to claim 1, wherein the image reader comprises:
a first image reader configured to read a first face of the recording medium; and
a second image reader configured to read a second face of the recording medium, the second face being different from the first face.

17. The image reading device according to claim 1, wherein the defective type information includes at least one of:
a white spot;
a black spot; or
a vertical streak.

18. The image reading device according to claim 1, wherein the circuitry is configured to determine the abnormality based on a detection threshold.

19. The image reading device according to claim 1, wherein the circuitry is configured to:
receive an input from a user indicating a detection threshold; and
determine the abnormality based on the detection threshold.

* * * * *